United States Patent [19]

Beatty

[11] 4,134,541

[45] Jan. 16, 1979

[54] FLUID SEPARATION DEVICE

[75] Inventor: Robert E. Beatty, Narberth, Pa.

[73] Assignee: Flexitallic Gasket Company Inc., Camden, N.J.

[21] Appl. No.: 672,070

[22] Filed: Mar. 30, 1976

[51] Int. Cl.² .............................................. F16T 1/10
[52] U.S. Cl. ...................................... 236/56; 236/59; 137/182; 137/183
[58] Field of Search .................................. 236/55–60; 138/41, 42; 137/513.7, 183, 182

[56] References Cited

U.S. PATENT DOCUMENTS

| 986,797 | 3/1911 | Boegen | 137/182 |
|---|---|---|---|
| 1,157,583 | 10/1915 | Roshanek | 137/183 |
| 1,592,747 | 7/1926 | Slagle | 137/513.7 |
| 1,881,637 | 10/1932 | Johnson | 236/15 A |
| 2,127,649 | 8/1938 | McKee | 137/183 |
| 2,513,875 | 7/1950 | Johnson | 236/56 |
| 2,827,077 | 3/1958 | Mitchell | 236/56 |
| 3,170,477 | 2/1965 | Scott, Jr. et al. | 137/183 |
| 3,347,257 | 10/1967 | Gleason, Jr. et al. | 137/183 |
| 3,711,017 | 1/1973 | Fujiwara | 236/59 |
| 3,715,870 | 2/1973 | Guzick | 55/202 |
| 3,724,751 | 4/1973 | Fujiwara | 236/59 |
| 3,877,895 | 4/1975 | Wonderland et al. | 55/97 |

Primary Examiner—John J. Camby
Assistant Examiner—Henry C. Yuen
Attorney, Agent, or Firm—Charles H. Lindrooth

[57] ABSTRACT

A condensate removal device which includes two parallel paths for removal of condensate and gases from a fluid system is provided with a thermostatically operated valve in one path and a drain orifice of a preselected size in the other path. The combination is disclosed as it is used in drain lines of a steam system. A bellows or other thermostatically operated valve controls one path to the drain and is in the open position during warmup of the system to permit the passage of the large quantities of air, condensate, particulates and other matter which are present in the system during the warmup stage of operation. The thermostatic element is designed to be closed at operating temperatures. The drain orifice in the other path is designed to continuously pass the condensate and the like which will form in the line when the system is at or near operating temperatures while restricting the passage of working vapor.

6 Claims, 2 Drawing Figures

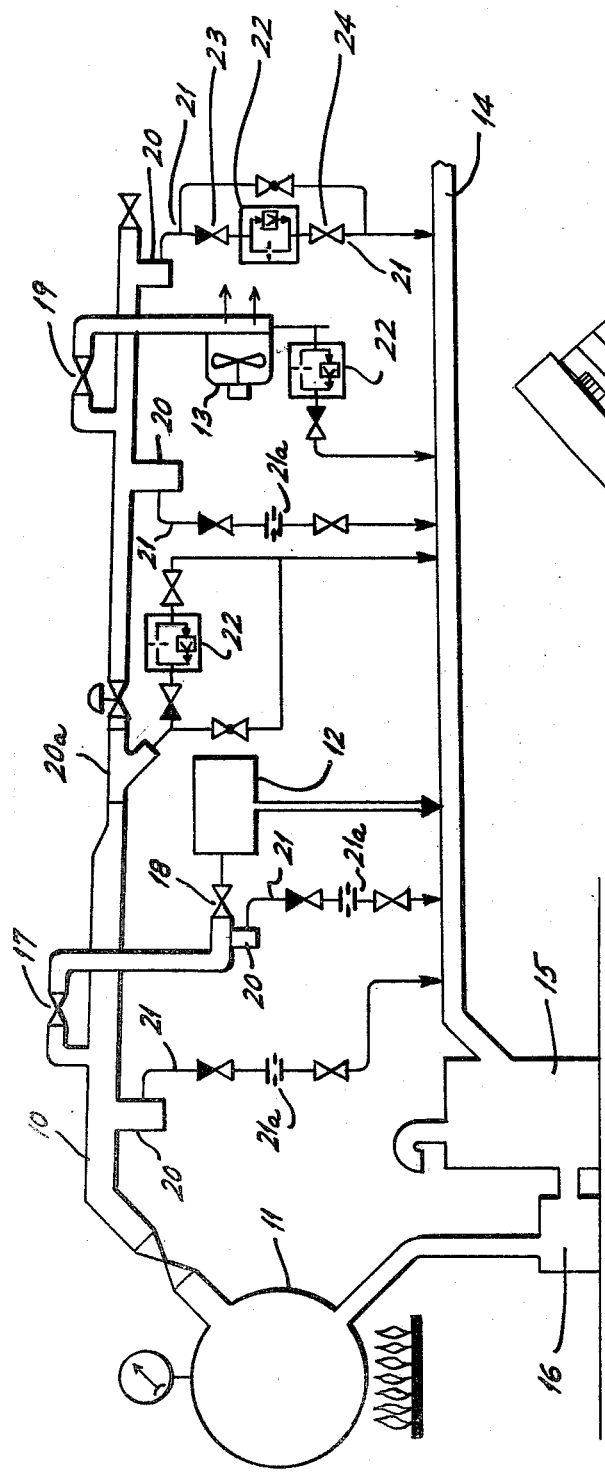
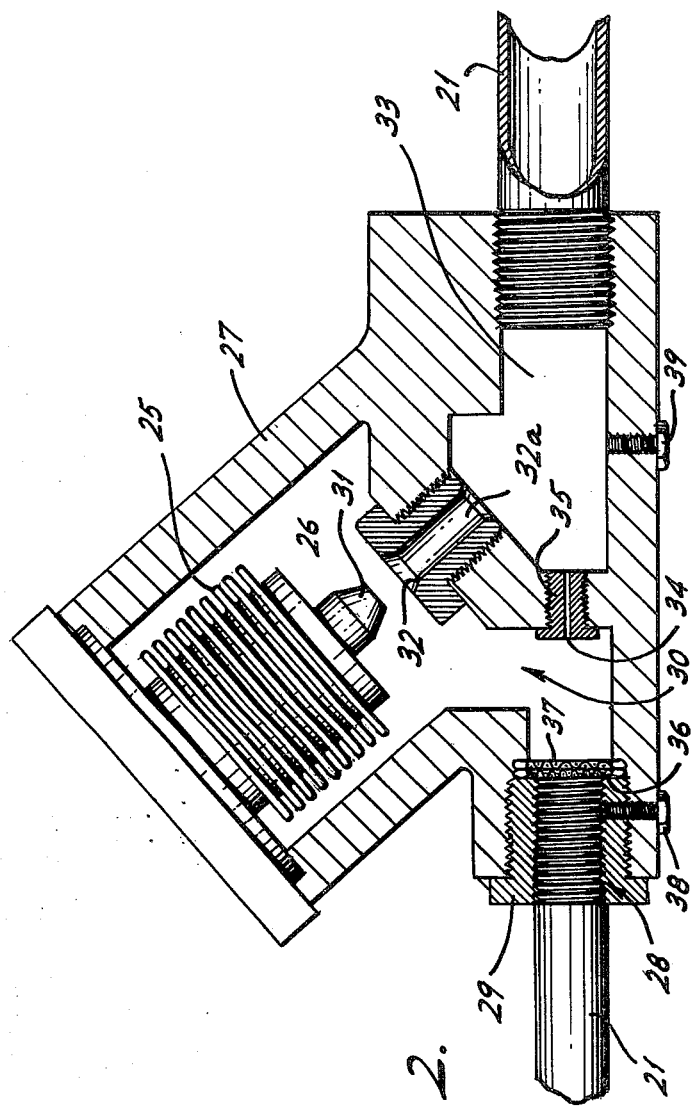

FLUID SEPARATION DEVICE

FIELD OF THE INVENTION

This invention has utility for the separation of one or more components such as condensed vapor, particulates and the like from working vapor in steam generating and other systems wherein the fluid medium undergoes changes from a liquid to a vapor state and wherein it is desirable to effect a separation of the liquid and the vapor. In certain of its aspects, the invention relates to the control of volumetric flow and temperature of a fluid medium.

BACKGROUND OF THE INVENTION

Although it will be apparent that its usefulness is not limited thereto, the invention has particular applicability to steam systems wherein it is desirable to separate condensed vapor and other materials from the working vapor.

During warmup in a steam supply system, large amounts of condensate, air and other gases are invariably found in the system and should be separated from the working vapor quickly for operational efficiency. Even after warm-up, some of the undesirable products are produced. Condensate formation is in large part due to pipe heat losses which result from heat radiation, convection and conduction through the pipe walls and occurs whether or not the pipes are insulated. Condensate is also formed due to the performance of work in the various applications of the system and is found in the dead-end sections of piping. No matter how formed, it causes a number of undesirable effects such as reduced system capacity for steam flow, water hammer, erosion due to the friction of fluid flow, corrosion due to dissolved oxygen and the presence of carbonic acid and damage to machinery due to high moisture content of the steam. In addition, the condensate, air, $CO_2$ and non-condensable vapors, reduce the heat transfer and have other undesirable side effects. In addition, dirt, rust and scale invariably accumulate, particularly when the system has been shut down for any appreciable period of time. As is recognized by those skilled in the art, it is fundamental that for efficient operation, all of these components should be removed from the system with a minimum loss of vapor and with the condensate preferably being returned to the feed tank for redelivery to the steam generating equipment.

According to conventional practice, steam traps of various classes are used in drain lines at points throughout the steam system where condensate may be found so as to remove the condensate and other materials as described above. One class of steam trap commonly employed is the thermostatic trap. These usually have a bellows or a bi-metallic element which fully or partially opens a valve to allow the passage of the condensate and undesirable gases when the temperature at the thermostatic element is below a predetermined value hereinafter termed the actuating temperature.

During the warmup stage of operation, when the temperature is well below the actuating temperature, the bellows or bimetallically controlled valve is in the open position and will pass the large amounts of condensate and other products present in the drain line. Once the warmup stage is passed, the preselected actuating temperature is reached and the thermostatic element closes the valve until condensate accumulates, at which point a condition of temperature imbalance develops, cooling the thermostatic element and causing the valve to open when the temperature is below the actuating temperature. It should be noted that in a typical installation the thermostatically operated trap cycles between the open and closed position on a regular basis. By way of example, it is not uncommon for such a trap to open and close 75,000 or more times a year. This continuous cycling leads to wear due to the constant operation of the thermostatically operated valve in seating and unseating as well as to fluid friction. This wear rapidly becomes appreciable during prolonged periods of operation. In relatively short periods of time the wear leads to leakage which is in addition to the normal seat leakage caused by mismatching of parts. Thus, cyclic operation soon leads to an appreciable loss of steam and reduction in the efficiency of the system. Even though a trap might be capable of blocking almost all vapor when it is new, it becomes a source of gradually increasing vapor leakage during its life span.

A further problem which is more acute in the case of bellows-type thermostatically operated traps, is that the bellows are subject to fatigue stressing as they are cycled and to damage by pressure surge and water hammer. Eventually failure of the bellows will occur if the traps are not replaced on a regular basis. When the bellows-type fails it fails in the open position, causing large amounts of steam to escape from the system until the source of the problem is located and corrected.

Although bimetallic type traps are not as subject to pressure surge or water hammer damage, these traps are affected by hysterisis losses with use so that their response characteristics change over a period of time.

The cyclic nature of the operation is also a cause of pressure and temperature fluctuations in the system and is thus a source of system inefficiency. In addition, these fluctuations create turbulence around the valve which contributes to valve wear.

One answer to many of the foregoing problems is the use of continuous drain orifice assembly of the kind shown in U.S. Pat. No. 3,877,895 owned by the assignee of this application and in U.S. Pat. No. 3,715,870. This assembly is a continuous condensate removal device with an orifice sized to pass the condensate produced in the system with a stable but nominally small steam loss. It is an effective and highly efficient condensate removal device when employed in a steam system in locations where the condensate load is predictable and load fluctuations are not a problem.

During warm-up and in certain other operations where condensate load fluctuates over a wide range, a thermostatic steam trap is more effective in that it is capable of automatically passing the large amounts of condensate produced under these conditions. However, for the reasons expressed above, the thermostatic steam trap is not as effective a device as a continuous drain orifice once the system has stabilized.

SUMMARY AND OBJECTS OF THE INVENTION

With the foregoing background in view, an important object of the invention is the provision of a fluid separating device which substantially continuously removes one component of the fluid despite variations in quantity of the component by incorporating the features of a thermostatically operated valve means and a continuous drain orifice assembly in parallel relationship. By incorporating the features of both devices, each device contributes to the operational efficiency of the other, producing unexpected operational efficiencies.

A related object of the invention is the provision of a condensate removal device which is capable of effecting substantial reductions in working vapor losses in a vapor generating system, over the life of the device.

A still further object of the invention is the provision of condensate removal means for a pressurized system which operates without causing upstream temperature and pressure variations.

Another object of the invention is the provision in a vapor supply system, of a continuously operating condensate removal device which is capable of meeting the condensate loads imposed on the system during warmup and operating phases of operation.

A still further object of the invention is the provision, in conjunction with a thermostatically operated trap, of means for reducing wear and fatigue stressing of the thermostatic element thereby prolonging the service life of the trap.

A further object of the invention is the provision of a condensate removal device having means for improving the efficiency of a vapor supply system by the reduction of vapor losses and of temperature and pressure fluctuations, while continuously removing condensate and gases, thereby resulting in a substantial energy savings as compared with prior art devices.

A still further object of the invention is the simplification and reduction in cost of installation and maintenance, in a condensate removal device, by incorporating in a single integral housing, a thermostatically operated steam trap in parallel with a continuous drain orifice device.

In summary, the above and other objects of the invention are achieved by equipment comprising a condensate removal device incorporating a thermostatically controlled valve which is designed to be open at or below a selected temperature upstream from the device so that the large condensate loads and the volume of air and other gases present at low temperature are readily removed from the system. The valve is closed at temperatures above the selected high temperature. A parallel path is provided around the thermostatically controlled valve which parallel path has a restriction which is relatively small with respect to the passage through the valve. According to the invention, the restriction is sized to pass only the relatively small amounts of condensate existing at operating temperatures, with minimal loss of working vapor, thereby preventing the buildup of condensate and substantially reducing the cycling of the thermostatically operating device at operating temperatures.

IN THE DRAWINGS

FIG. 1 is a schematic view showing, by way of background, a simple steam piping system having condensate removal devices incorporating the principles of my invention; and FIG. 2 is a sectional view of a preferred form of condensate removal device of the kind incorporated in the system of FIG. 1.

DESCRIPTION OF THE ILLUSTRATIVE EMBODIMENT

Attention is first directed to FIG. 1, which shows in schematic form, a steam system in which the invention may be used. As shown in FIG. 1, steam is delivered through a supply main 10 from a boiler or steam generating means 11. The supply main 10 furnishes steam for the operation of equipment such as reciprocating machinery shown schematically at 12 and a unit heater shown at 13. A return line 14 is provided for the return of steam, condensate and noncondensable gases to a vented feed tank 15. A feed pump 16 takes the condensate and make-up water from the feed tank and supplies it to the boiler or steam generating means 11.

Suitable valving such as gate valves schematically represented at 17, 18 and 19 control the supply of steam to the equipment to be operated.

Condensate removal devices incorporating the principles of the present invention are provided at various points in the steam supply system and as a general rule are provided wherever it is necessary to provide for automatic removal of the larger condensate loads existing during warm-up such as at low points or end points or where the load is found to fluctuate greatly during operation as at heater locations. At other points in the system where the condensate load does not fluctuate appreciably, drain orifice assemblies of the kind described in the above identified U.S. Pat. No. 3,877,895 may be provided. In a system as shown in FIG. 1, the steam main 10 loses heat through radiation, conduction and convection causing condensate to form. This accumulates at the bottom of the main and runs to the right, as shown in the Figure, due to the pitch of the main and due to gravity, until it spills into drip legs 20 located at intervals along the main. The condensate accumulates in drip legs 20 until it reaches a level sufficient to enter the drain lines 21 or pass out through the bottom of Y-strainer 20a. As described hereinafter, the condensate, air, oxygen, $CO_2$ and noncondensable gases are continuously passed to the return line 14 and returned to the feed and vent tank 15 by condensate removal devices constructed according to the invention as shown at 22 or where suitable, by drain orifice assemblies of the kind shown in U.S. Pat. No. 3,877,895 and represented in FIG. 1 by the reference character 21a.

Reference is now made to FIG. 2 for a detailed description of an illustrative form of condensate removal device used in a system of the kind just described. As indicated above, devices formed according to our invention are incorporated into the condensate drain lines at pipe end-points or other points where condensate loads are apt to fluctuate widely. Such devices are shown at 22 in FIG. 1, in the drain line 21 at the end of main 10, in the drain line for heater 13 and in the drain form Y-strainer 20a. A check and stop valve 23 is preferably located in any upstream section of the drain line 21 where desired to prevent reverse flow. A gate valve 24 may be provided in the downstream section of the line.

Basically considered, each device preferably incorporates thermostatically controlled valve means in a flow path to the drain and a continuous drain orifice in a parallel flow path. The thermostatically controlled valve means preferably includes a conventional expandable bellows 25 mounted in a chamber 26 within housing 27 formed of cast iron or other suitable material. Housing 27 has a threaded inlet opening 28 which is connected to the upstream side of drain line 21 by means of an externally and internally threaded sleeve-type insert 29 which is threaded into the opening in the housing. Within the housing downstream from inlet opening 28, a passge 30 leads to the bellows chamber 26.

Bellows 25 carries a valve closure member 31 which seats on a valve seat or port 32 when the bellows is fully expanded and is adapted to lift off the seat as the bellows contracts.

A passage 32a, which is opened or closed depending upon the position of bellow operated valve member 31, leads to an outlet passage 33 which is threadedly connected to the downstream leg of the drain line 21.

As will be understood by those of ordinary skill in the art, bellows 25 is filled with a thermally expandable liquid and at a normal or contracted position allows the passage of condensate through the port 32 at temperatures below a preselected temperature. When the preselected temperature is reached, which is generally a temperature at or near the saturation temperature of steam in the case of a steam supply system, the bellows will fully expand due to an increase in bellows internal pressure caused by the transformation of bellows liquid into gas so as to close the port 32, thereby blocking the flow of working vapor, condensate an the like. Should the temperature again drop below the preselected temperature as happens when substantial amounts of condensate accumulate in the bellows chamber, the bellows will contract and the valve 31 lifts off its seat to allow the passage of the condensate through the passage 32a and through the downstream leg of drain line 21 to the recovery line for return to the feed tank 15.

In carrying out the invention, a drain orifice 34 is provided in the wall separating the inlet passage 30 and the outlet passage 33 within the housing 27 thus providing a path which is parallel to the path through port 32. Orifice 34 is preferably drilled into a threaded insert 35 which is adapted to be threaded into the opening in the wall.

In accordance with the invention, the size of orifice 34 is somewhat critical. It is important that the orifice have a capacity which is sufficient to prevent the accumulation of condensate in the inlet 30 and thence in the bellows chamber 26 when the system is at or near operating temperatures. Although the orifice may be slightly larger than is required to pass the normal condensate load at operating temperatures, it is important that it is not so large as to exceed the condensate load by too great an extent as this will result in a needless sacrifice of working vapor. As will be understood by those skilled in the art, the orifice passage should not be so long that steam flashing and scrubbing takes place. By proper design of the orifice based on the calculation of condensate load for the line to be drained, it can be sized so that it is just large enough to allow the passage of all condensate and unwanted gases at operating temperature plus a small safety factor so that it limits the escape of appreciable working vapor. The thermostatically operated valve will then remain closed except during the warm-up stages or when some abnormal condition develops. Should an extraordinary amount of condensate be received, this will cause the bellows to open the valve so that this condensate is quickly passed through the drain line. In this manner, by proper selection of orifice size in relation to the system parameters, condensate rarely accumulates in the bellows chamber and cyclic operation of the bellows can be practically eliminated.

By providing the orifices in threaded plugs, the orifices can be interchangeable and the device can readily be fitted with an orifice of desired size.

In carrying out the invention, it is important that the orifice 34 is protected from clogging by particulates which may be carried through drain line 21 from the steam main 10. For this purpose, it is preferred that a fine mesh screen 36 be provided upstream from the orifice 34. Preferably screen 36 has a small mesh size in relation to size of the orifice 34 so as to only pass particulates which will freely pass through the orifice 34, thereby preventing clogging of the orifice. Preferably fine mesh screen 36 is backed up by a coarser mesh screen 37 which acts as a support or reinforcing means.

Preferably, the screens 36 and 37 seat in a recess at the end of the threaded opening 28 in body 27 and are locked in position in the passageway 30 by means of the threaded plug 29.

As is shown in the drawings, it is preferred that the screen 36 can also be located upstream from the bellows chamber 26 so as to prevent the accumulation of debris around the thermostatically operated valve which might contribute to wear or interfere with valve performance.

It is also preferred that plugs 38 and 39 be located in the inlet and outlet passages 28 and 33 respectively. These plugs are preferably threaded into openings drilled through the side wall of the casting. Removal of plug 38 permits periodic flushing of the screen 36 by venturi action of the working vapor. By removal of plug 39 and closure of valve 24, the device may be isolated from the balance of the drain system for operational testing according to customary practice.

By the use of the invention, as compared with the use of prior art thermostatically operated traps, the number of operations of the thermostatically operated element is dramatically reduced. In consequence of this, wear at the valve seat can be minimized so that leakage through the valve is held to an extremely low level. Another consequence is that the fatigue life of the bellows or thermally activated element is indefinitely prolonged. A substantial savings due to reduction in steam leakage losses, in replacement costs of the equipment, and further savings due to a reduction in labor required by frequent replacement are achieved.

It should be apparent that the invention provides a highly effective and simplified means for constantly separating a component such as condensate from a fluid supply system. By appropriate selection of the response characteristics for the valve means in the one parallel path, large volumes of any component to be separated, as may be produced by condensation of steam during warmup in a steam supply system, may be removed. By the elimination of cyclic operation of the valve, a number of important objectives, as expressed above, are achieved. Although the invention is primarily explained in the context of the removal of condensate from a steam system, other applications should become apparent to those skilled in the art. By way of example of other applications of the invention, the component to be separated may be the gaseous phase of natural gas in liquified natural gas pipelines. In temperature control applications, the invention is capable of maintaining a predictable upstream temperature range through the use of a properly sized orifice in a path in parallel with a thermally responsive element which is responsive within the desired temperature range.

I claim:

1. In a pressurized fluid supply system, apparatus for the continuous separation of condensate of the fluid from the system while limiting removal of vapor, wherein the condensate load is a relatively small value during most conditions of the operation and is a relatively large value during other conditions of operation; means establishing a primary flow path in communication with said system for continuous removal of the condensate, said primary flow path having a flow restriction therein of first cross-section sized to restrict flow therethrough to pass the quantities of condensate existing in said primary flow path during most conditions of operation of the system and means including a valve having a port controlled thereby for establishing a flow path of second cross-section across said port, said second cross-section being large with respect to the first cross-section and of a size capable of passing excess quantities of condensate existing when the capacity of said flow restriction of first cross-section is exceeded, and temperature responsive means in said last named flow path and responsive to the temperature existing on the upstream side of the restriction when said condensate is present in predetermined quantities beyond the capacity of said restriction for opening said valve when condensate is present in quantities beyond the capacity of said flow restriction and for closing said valve at temperature existing when condensate is not present in quantities beyond the capacity of said restriction.

2. Apparatus according to claim 1 wherein said flow restriction is continuously open.

3. Equipment for the continuous separation of condensate and the like from a system for the supply of a working vapor wherin condensate load is a relatively small value during most conditions of the operation and is a relatively large value during other conditions of operation comprising; a first flow path draining condensate having thermostatically responsive valve means including a port sized to pass the condensate load existing in said flow path at temperatures below a selected temperature and a thermostatically responsive valve member including an element responsive to temperatures prevailing upstream of the port to open the port at temperatures below the selected temperature and to close the port at temperatures above the selected temperature and a second flow path bypassing said first flow path, operative for continuously draining of condensate when said valve means is closed, said second flow path including an orifice of small diameter relative to the diameter of said port, the size of the orifice being limited to that required to pass the condensate load existing in the system during most conditions of vapor during said last named conditions of operation.

4. In equipment for removing condensate or the like from a fluid system over a range of temperature conditions, the combination in a housing having an inlet connected to said fluid system; valve means downstream from the inlet, said valve means including a valve port for passing condensate loads received from said system, temperature responsive means including a thermally responsive element between the inlet and the port for opening and closing said port, said temperature responsive means being operative to open said port at low temperatures to pass any condensate existing in the inlet at said low temperatures and to close said port at temperatures above a selected higher temperature, said housing having an orifice to form a parallel path around said port for continuous passing of condensate, said orifice providing a restriction which is relatively small with respect to the size of said port, said restriction being sized to prevent the accumulation of condensate upstream from the port when the port is closed at temperatures above said selected higher temperature.

5. Equipment according to claim 4 further including a strainer in said housing upstream from said restriction, sized to block particles larger than said restriction.

6. A method of separation of condensate from vapor which comprises first diverting the condensate from the vapor in accordance with relative densities of the condensate and the vapor, thereafter continuously delivering the condensate through an orifice having a size limited to pass the flow of said condensate existing at the orifice at temperatures of said condensate within a first temperature range, sensing the temperature of said component upstream of the orifice an providing a parallel path for quantities of condensate not passed by said orifice in response to temperatures of said condensate at the upstream side of said orifice within a second temperature range.

* * * * *

UNITED STATES PATENT AND TRADEMARK OFFICE
CERTIFICATE OF CORRECTION

PATENT NO. : 4,134,541

DATED : January 16, 1979

INVENTOR(S) : Robert E. Beatty

It is certified that error appears in the above-identified patent and that said Letters Patent are hereby corrected as shown below:

Column 5, Line 4, "bellow" should be --bellows--.

Column 7, Line 39, "continuously" should be --continuous--.

Column 8, Line 3, --operation while being small enough to restrict the escape of working-- should be inserted after "of".

Column 8, Line 36, "an" should be --and--.

Signed and Sealed this

Twenty-seventh Day of May 1980

[SEAL]

Attest:

SIDNEY A. DIAMOND

Attesting Officer

Commissioner of Patents and Trademarks